United States Patent Office
3,274,240
Patented Sept. 20, 1966

3,274,240
SYNTHESIS OF 3-SUBSTITUTED ALKANOIC ACID COMPOUNDS
Henry E. Fritz, South Charleston, W. Va., assignor to Union Carbide Corporation, a corporation of New York
No Drawing. Filed Sept. 10, 1962, Ser. No. 222,691
9 Claims. (Cl. 260—515)

This invention relates to a novel method for producing 3-substituted alkanoic acids, their alkali metal salts, or their esters. More particularly, this invention relates to a novel method for producing alkanoic acids and their alkali metal salts or esters which are substituted in the 3-position wth a polycyclic hydrocarbon radical.

The process of this invention essentially comprises reacting at elevated temperatures a polycyclic compound containing an active hydrogen atom, as hereinafter defined, with an alkali metal acrylate in contact with a strong base as a catalyst, whereby an alkali metal salt of a 3-substituted alkanoic acid is produced, which can be converted to the free acid or the ester of the acid, as may be desired.

The immediate product of the process of this invention is an alkali metal salt of a carboxylic acid which is readily acidified to the free acid which, in turn, can be esterfied according to methods known to those skilled in the art. The di- and tri-acids produced by the process of this invention are useful in themselves as monomers for the production of polyesters, and all the free acids can be used as intermediates for the production of other polymerizable monomers. For example, amino acids can be produced by nitration of the free acid or by the condensation of the free acid with acrylonitrile, followed by the reduction of the nitro or nitrile group. The amino acids in turn can be converted to hydroxy acids by diazotization of the amino group. Both the amino acids and the hydroxy acids are useful as monomers for the production of polymeric products.

The 3-substituted alkanoic acid compounds which are produced by the process of this invention are represented by the general formula:

$$A(CH_2CHRCOOZ)_n$$

wherein Z is a hydrogen atom, an alkali metal atom, such as lithium, sodium, potassium, rubidium, or cesium, or an alkyl radical having from 1 to about 10 or more carbon atoms; R is a hydrogen atom, an alkyl radical of from 1 to 6 carbon atoms, or phenyl; n is an integer having a value of from 1 to 3; and A is a monovalent 1,2,3,10b-tetrahydrofluoranthen-10b-yl radical, a monovalent fluoren-9-yl radical, a monovalent iden-1-yl radical, a divalent 9,9-fluorenylene radical, a divalent 1,3-indenylene radical, or a trivalent 1,1,3-indenenyl radical.

The compounds produced by the process of this invention are conveniently represented in the free acid form by the formula:

$$A(CH_2CHRCOOH)_n$$

As examples of such compounds one can mention:

10b-(2-carboxyethyl)-1,2,3,10b-tetrahydrofluoranthene,
10b-(2-carboxypropyl)-1,2,3,10b-tetrahydrofluoranthene,
10b-(1-phenyl-2-carboxyethyl)-1,2,3,10b-tetrahydrofluoranthene,
9-(2-carboxyethyl)fluorene,
9-(2-carboxyoctyl)fluorene,
9-(1-phenyl-2-carboxyethyl)fluorene,
9,9-bis(2-carboxyethyl)fluorene,
9-(carboxymethyl)-9-(2-carboxyethyl)fluorene,
9-(5-carboxypentyl)-9-(2-carboxyethyl)fluorene,
1-(2-carboxyethyl)indene,
1,3-bis(2-carboxyethyl)indene,
1,1,3-tris(2-carboxyethyl)indene,
1-(2-carboxyethyl)-3-(carboxymethyl)indene,
1-(2-carboxyethyl)-3-(5-carboxypentyl)indene,
1-(2-carboxyethyl)-1,3-bis(carboxymethyl)indene,
1-(2-carboxyethyl)-1,3-bis(5-carboxypentyl)indene,
1-(carboxymethyl)-1,3-bis(2-carboxyethyl)indene,
1-(5-carboxypentyl)-1,3-bis(2-carboxyethyl)indene,
and the like.

The polycyclic compounds containing an active hydrogen atom which are employed as starting materials in the process of this invention are substituted and unsubstituted indene, fluorene, or 1,2,3,10b-tetrahydrofluoranthene. It is essential to the process of this invention that the indene employed have at least one hydrogen atom on the 1-position, that the fluorene employed have at least one hydrogen atom on the 9-position, and that the tetrahydrofluoranthene have a hydrogen atom on the 10b-position. The carbocyclic nuclei of these compounds can be generally represented by the formula:

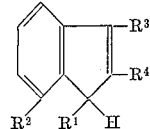

wherein each $R^1$, $R^2$, $R^3$, and $R^4$, when taken alone, is a hydrogen atom; $R^1$ and $R^2$, when taken together form a trimethylene radical; and $R^3$ and $R^4$, when taken together, form a butadienylene radical. Note that there is at least one active hydrogen atom on the methylene carbon atom of the cyclopentadienyl portion of the carbocyclic nucleus. As long as this hydrogen atom is present the process of this invention will proceed. The remaining valencies of the carbon atoms of the polycyclic nucleus can be substituted with any group which is nonreactive under the reaction conditions, such as hydrocarbon radicals free from olefinic or acetylenic unsaturation having from 1 to about 20 carbon atoms, including alkyl radicals such as methyl, ethyl, propyl, isopropyl, 2-ethylhexyl, decyl, eicosyl, and the like; aralkyl radicals, such as benzyl, phenethyl, and the like; aryl radicals, such as phenyl and naphthyl; alkaryl radicals, such as tolyl, xylyl, mesityl, and the like; 2-(9-fluorenyl)ethyl, 6-(9-fluorenyl)hexyl and the like; as well as hydrocarbyloxy radicals having from 1 to 20 carbon atoms, such as alkoxy, aralkoxy, aryloxy, and alkaryloxy radicals; and carboxyalkyl radicals having from 2 to about 10 carbon atoms, such as carboxymethyl, carboxyethyl, carboxypropyl, and the like, etc. As examples of suitable polycyclic compounds one can mention indene, 1-methylindene, 2-methylindene, 3-methylindene, 4-methylindene, 5-methylindene, 6-methylindene, 7-methylindene, 1-(2-ethylhexyl)indene, 1,3-diethylindene, 2-phenylindene, 2-(3 - carboxypropyl)indene, 1,3 - bis(3 - carboxypropyl) indene, fluorene, 1-ethylfluorene, 2-ethylfluorene, 3-ethylfluorene, 4-ethylfluorene, 5-ethylfluorene, 6-ethylfluorene, 7-ethylfluorene, 8-ethylfluorene, 9-ethylfluorene, 9-(3-carboxypropyl)fluorene, 1,2-bis(9-fluorenyl)ethane, 1,6-bis(9 - fluorenyl)hexane, 1,2,3,10b - tetrahydrofluoranthene, and the like.

The alkali metal acrylates which are employed in the process of this invention are alkali metal salts of acrylic acid and the alkali metal salts of acrylic acid substituted in the 2-position with an alkyl radical or an aryl radical. These compounds can be represented by the formula $CH_2=CRCO_2M$ wherein M is an alkali metal, such as lithium, sodium, potassium, rubidium or cesium and R is a hydrogen atom, an alkyl radical, preferably having from 1 to 6 carbon atoms, such as methyl, ethyl, propyl, butyl, hexyl, and the like, or an aryl radical, preferably phenyl. As examples of suitable alkali metal acrylates one can mention lithium acrylate, sodium acrylate, potassium acrylate, rubidium acrylate, cesium acrylate, potassium methacrylate, potassium 2-methylenebutyrate, potassium 2-methylenevalerate, potassium 2-methyleneheptanoate, potassium atropate, and the like.

The mole ratio of alkali metal acrylate to polycyclic compound in the reaction mixture can vary from about 0.5:1 or less to about 4:1 or higher. Where a monocarboxylic acid is desired, it is preferred to employ mole ratios of from about 1:1 to about 1.5:1; where a dicarboxylic acid is desired, the mole ratio is preferably from about 2:1 to about 2.5:1; and when a tricarboxylic indene is desired as the final product, the mole ratio is preferably about 3:1 or greater.

As previously indicated, a strong base is employed as a catalyst for the process of this invention. The strong base can be an alkali metal hydroxide, such as lithium hydroxide, sodium hydroxide, potassium hydroxide, rubidium hydroxide, cesium hydroxide; and alkali metal oxide, such as lithium oxide, and the like; an alkali metal superoxide, such as potassium superoxide and the like; an alkali metal alkoxide, such as sodium methoxide, sodium ethoxide, and the like, etc. The alkali metal hydroxides are preferred catalysts, with potassium hydroxide being especially preferred.

The catalytic amount of strong base employed in the process of this invention is at least about 0.01 mole percent, and can be as high as 75 or more mole percent of base per total moles of polycyclic compound and alkali metal acrylate, with from about 0.1 to about 20 mole percent preferred. Smaller amounts than 0.01 mole percent are not recommended because the reaction rate is very low at these concentrations. Higher amounts than 2.0 mole percent can be employed if desired, but afford no particular advantages.

If the polycyclic compound is a carboxylic acid, such as 9-(3-carboxypropyl)fluorene, the compound should be charged to the reaction mixture as its alkali metal salt or sufficient base should be charged to the reaction mixture to convert the acid to its alkali metal salt. Similarly, the acrylic acid may be charged to the reaction as the free acid if sufficient base is charged to convert the acid to the corresponding alkali metal salt.

The process of this invention is conducted at temperatures of from about 150° C. or lower, to about 350° C. or higher, with temperatures of from about 190° C. to about 290° C. preferred. The reaction is normally conducted at autogenous pressure. Higher and lower pressures can be employed but afford no particular advantages. The 3-substituted alkanoic acid produced is recovered from the reaction mixture by methods known to those skilled in the art.

The following examples are illustrative:

*Example I*

A 1-liter, rocker autoclave was charged with 166 grams of fluorene, 80 grams of acrylic acid, and 100 grams of potassium hydroxide. The autoclave was sealed, heated to 216° C. in one hour, and maintained at 212–228° C. for 20 hours while agitating the reaction mixture by rocking. During this time the maximum pressure in the autoclave was 50 p.s.i.g. The autoclave was then cooled to room temperature, opened, and the contents were mixed with one liter of water and one liter of isopropyl ether. The water and isopropyl ether layers were separated and 86 grams of unreacted fluorene were recovered from the isopropyl ether layer. The aqueous layer containing the potassium salts of 9-(2-carboxyethyl)fluorene and 9,9-bis(2-carboxyethyl)fluorene was acidified with concentrated hydrochloric acid to a pH of 2, whereupon a mixture of 9,9-bis(2-carboxyethyl)fluorene and 9-(2-carboxyethyl)fluorene weighing 128 grams precipitated. A 45-gram portion of the mixture was heated with 450 grams of methanol and 5 grams of p-toluenesulfonic acid. From the resulting reaction mixture a quantitative yield of crude dimethyl ester of 9,9-bis(2-carboxyethyl)fluorene was recovered which, after recrystallization from ethyl ether, weighed 22 grams, melted at 84° C., and boiled at 190° C. at 0.4 mm. of mercury pressure.

*Microanalysis.*—Calculated for $C_{21}H_{22}O_4$: C, 74.5%; H, 6.6%. Found: C, 74.5%; H, 6.6%.

Saponification equivalent.—Calculated, 169. Found, 170.

The forecuts of the distillation from the esterification and the residues from the recrystallization were combined and redistilled to recover about 10 grams of the methyl ester of 9-(2-carboxyethyl)fluorene which boiled at 152° C. at 0.4 mm. of mercury pressure. On recrystallization from cyclohexane, the methyl ester of 9-(2-carboxyethyl)fluorene melted at 57–59° C.

*Microanalysis.*—Calculated for $C_{17}H_{16}O_2$: C, 80.9%; H, 6.4%. Found: C, 81.4%; H, 6.1%.

Percent fluorene ring.—Calculated, 63%. Found, 61%.

The structure of the methyl ester of 9-(2-carboxyethyl)fluorene was confirmed by infrared analysis. Employing similar procedures, 9-(2-carboxypropyl)fluorene, its alkali metal salts, or alkyl esters and 9,9-bis(2-carboxypropyl)fluorene, its dialkali metal salts, or dialkyl esters are produced by substituting methacrylic acid for acrylic acid; and 9-(2-carboxyheptyl)fluorene, its alkali metal salts, or alkyl esters, and 9,9-bis(2-carboxyheptyl)-fluorene, its dialkali metal salts, or its dialkyl esters are produced by substituting 2-methyleneheptanoic acid for acrylic acid.

*Example II*

A 1-liter rocker autoclave was charged with 126 grams of 9-(3-carboxypropyl)fluorene, 108 grams of acrylic acid, and 200 grams of potassium hydroxide. The autoclave was sealed and heated at 260° C. for 10 hours while agitating the reaction mixture by rocking. The autoclave was then cooled and the contents, containing the dipotassium salt of 9-(3-carboxypropyl)-9-(2-carboxyethyl)fluorene, were admixed with 2 liters of water. After filtration of solids from the resulting slurry, the aqueous filtrate was acidified with concentrated hydrochloric acid to a pH of 2 and the acidic mixture was extracted with 1 liter of isopropyl ether. After evaporation of the isopropyl ether from the ether extract and recrystallization of the remaining solids from a 50% benzene-50% isopropanol mixture, the 9-(3-carboxypropyl)-9-(2-carboxyethyl)fluorene thus recovered weighed 69 grams and melted at 187° C. to 187.5° C.

*Microanalysis.*—Calculated for $C_{20}H_{20}O_4$: C, 74.1%; H, 6.3%. Found: C, 74.4%; H, 6.4%.

Twelve grams of 9-(3-carboxypropyl)-9-(2-carboxyethyl)fluorene produced above were refluxed with 300 ml. of methanol and 2.0 grams of p-toluenesulfonic acid for 20 hours. After distillation and recrystallization from diethyl ether there were recovered 8.5 grams of the dimethyl ester of 9-(3-carboxypropyl)-9-(2-carboxyethyl)-fluorene which melted at 70.0° C.–70.5° C.

*Microanalysis.*—Calculated for $C_{22}H_{24}O_4$: C, 75.0%; H, 6.9%. Found: C, 74.9%; H, 7.0%.

Saponification equivalent.—Calculated, 176. Found, 176 and 177.

In a similar manner 9-(3-carboxypropyl)-9-(2-carboxypropyl)fluorene, its dialkali metal salts, or dialkyl esters are produced by substituting methacrylic acid for acrylic acid; and 9-(3-carboxypropyl)-9-(2-carboxyheptyl)fluorene, its dialkali metal salts, or dialkyl esters are produced by substituting 2-methyleneheptanoic acid for acrylic acid.

*Example III*

A 3-liter, stainless steel, rocker autoclave was charged with 501 grams of 9-(5-carboxypentyl)fluorene, 225 grams of acrylic acid, and 450 grams of potassium hybis(1-carboxyethyl)indene, 1,1,3-tris(2-carboxyethyl)indroxide. The autoclave was sealed, heated to 220° C. over 2½ hours, and held at 220±5° C. for 20 hours while agitating the reaction mixture by rocking. The autoclave was then cooled to room temperature, opened, and the contents admixed with 3 liters of water. After filtration of the solids from the resulting mixture, the aqueous filrate containing the dipotassium salt of 9-(2-carboxyethyl)-9-(5-carboxypentyl)fluorene was acidified with concentrated hydrochloric acid to a pH of 2, whereupon a white, viscous oil formed, which was 9-(2-carboxyethyl)-9-(5-carboxypentyl)fluorene. The 9-(2-carboxyethyl)-9-(5-carboxypentyl)fluorene was separated from the aqueous mixture and admixed with 1.5 liters of methanol. The methanolic mixture was filtered, the filtrate was mixed with 15 grams of p-toluenesulfonic acid, and the mixture was refluxed for 24 hours. On distillation of the resulting reaction mixture 398 grams of the dimethyl ester of 9-(2-carboxyethyl)-9-(5-carboxypentyl)fluorene were obtained which boiled at 215–218° C. at 0.3 mm. of mercury pressure and had an index of refraction, $n_D^{20}$, of 1.5604.

*Microanalysis.*—Calculated for $C_{24}H_{28}O_4$: C, 75.76%; H, 7.42%. Found: C, 75.95%; H, 7.47%.

In a similar manner, 9-(2-carboxyethyl)-9-(5-carboxypentyl)fluorene is produced by substituting sodium hydroxide or sodium ethoxide for potassium hydroxide.

*Example IV*

A 3-liter, stainless steel, rocker autoclave was charged with 200 grams of 1,2,3,10b-tetrahydrofluoranthene, 100 grams of acrylic acid, 100 grams of potassium hydroxide, and 500 milliliters of isopropanol. The autoclave was sealed and the reaction mixture was heated to 240° C. over 2¾ hours and maintained at 240±6° C. for 20 hours. The autoclave was then cooled to room temperature, opened, and the contents were slurried with one-liter of water. The aqueous slurry was filtered to recover 109 grams of unreacted tetrahydrofluoranthene. The aqueous filtrate, containing the potassium salt of 10b-(2-carboxyethyl)-1,2,3,10b-tetrahydrofluoranthene was acidified with concentrated hydrochloric acid to a pH of 2, whereupon white crystals of 10b-(2-carboxyethyl)-1,2,3,10b-tetrahydrofluoranthene precipitated. After recrystallization from 1 liter of benzene, the acid weighed 92 grams. After two recrystallizations of a portion of the acid from methanol, the purified acid melted at 180.5–182.5° C.

*Microanalysis.*—Calculated for $C_{19}H_{18}O_2$: C, 81.99%; H, 6.52%. Found: C, 82.10%; H, 6.59%.

Neutralization equivalent.—Calculated, 278.3. Found, 274.

In a similar manner, 10b-(2-carboxypropyl)-1,2,3,10b-tetrahydrofluoranthene is produced by substituting methacrylic acid for acrylic acid; and 10b-(2-carboxyheptyl)-1,2,3,10b-tetrahydrofluoranthene is produced by substituting 2-methyleneheptanoic acid for acrylic acid.

*Example V*

A 3-liter, stainless steel, rocker autoclave was charged with 116 grams of indene, 230 grams of acrylic acid, and 280 grams of potassium hydroxide. The autoclave was sealed, heated to 240° C. over 1.5 hours, and maintained at 240±4° C. for 20 hours while agitating the reaction mixture by rocking. The autoclave was then cooled, opened, and the contents were admixed with 2-liters of water. The aqueous mixture was filtered to remove traces of solid impurities and the aqueous filtrate was extracted twice with 250-milliliter portions of isopropyl ether. The aqueous raffinate, containing the tripotassium salt of 1,1,3-tris(2-carboxyethyl)indene was acidified with concentrated hydrochloric acid to a pH of 2, whereupon 206 grams of tan colored, taffy-like 1,1,3-tris(2-carboxyethyl)-indene separated, which were recovered by decantation of the acidic aqueous layer. The 1,1,3-tris(2-carboxyethyl)-indene was mixed with 500 milliliters of methanol and 20 grams of p-toluenesulfonic acid and the mixture was refluxed for 10 hours, cooled and then admixed with 1 liter of distilled water, whereupon a brown oil separated. The aqueous alcoholic mixture was extracted with one liter of isopropyl ether, the ether extract was washed with aqueous 10 percent sodium hydroxide, and then with distilled water until neutral. A brown oil weighing 189 grams was recovered by evaporation of the ether. The oil was then distilled at reduced pressure and 37 grams of the trimethyl ester of 1,1,3-tris(2-carboxyethyl)indene were recovered as a fraction which boiled at 195° C. at 10 mm. of mercury pressure and had an index of refraction, $n_D^{20}$, of 1.5228. Saponification equivalent.—Calculated, 125. Found, 130.

In a similar manner, 1,1,3-tris(2-carboxypropyl)indene is produced by substituting methacrylic acid for acrylic acid; 1,1,3-tris(2-carboxyheptyl)indene is produced by substituting 2-methyleneheptanoic acid for the acrylic acid; 1,3-bis(3-carboxypropyl)1-1(2-carboxyethyl)indene is produced by substituting 1,3-bis(3-carboxypropyl)indene for indene; and 1,3-bis(2-carboxyethyl)-1-(3-carboxypropyl)indene is produced by substituting 1-(3-carboxypropyl)indene for indene.

What is claimed is:

1. A process for producing an alkanoic acid compound substituted in the 3-position by a polycyclic organic radical, which comprises heating at 150° C. to 350° C. a mixture of (a) a member selected from the group consisting of indene having at least one hydrogen atom on the 1-position, fluorene having at least one hydrogen atom on the 9-position, and 1,2,3,10b-tetrahydrofluoranthene having hydrogen atom on the 10b-position, (b) an alkali metal acrylate of the formula $CH_2=CRCO_2M$ wherein R is selected from the group consisting of hydrogen, alkyl of from 1 to 6 carbons and phenyl, and M is an alkali metal and (c) a catalytic amount of a strong base derived from an alkali metal.

2. The process for producing an alkanoic acid compound substituted in the 3-position by a fluoren-9-yl radical which comprises heating at 150° C. to 350° C. a mixture of fluorene having at least one hydrogen atom on the 9-position, an alkali metal acrylate of the formula

wherein R is selected from the group consisting of hydrogen, alkyl of from 1 to 6 carbons and phenyl, and M is an alkali metal and a catalytic amount of an alkali metal hydroxide.

3. The process for producing a member selected from the group consisting of 9-(2-carboxyethyl)fluorene, 9,9-bis-(2-carboxyethyl)fluorene, and mixtures thereof, which comprises heating at 150° C. to 350° C. a mixture of fluorene, potassium acrylate, and a catalytic amount of potassium hydroxide.

4. The process for producing 9-(3-carboxypropyl)-9-(2-carboxyethyl)fluorene which comprises heating at 150° C. to 350° C. a mixture of the potassium salt of 9-(3-carboxypropyl)fluorene, potassium acrylate, and catalytic amount of potassium hydroxide.

5. The process for producing 9-(5-carboxypentyl)-9-(2-carboxyethyl)fluorene which comprises heating at 150° C. to 350° C. a mixture of the potassium salt of 9-(5-carboxypentyl)-fluorene, potassium acrylate and a catalytic amount of potassium hydroxide.

6. The process for producing an alkanoic acid substituted in the 3-position with an indenyl radical which comprises heating at 150° C. to 350° C. a mixture of indene having at least one hydrogen atom in the 1-position, an alkali metal acrylate of the formula

wherein R is selected from the group consisting of hydrogen, alkyl of from 1 to 6 carbons and phenyl, and M is an alkali metal and a catalytic amount of an alkali-metal hydroxide.

7. The process for producing a member selected from the group consisting of 1-(2-carboxyethyl)indene, 1,3,- dene, and mixtures thereof which comprises heating at 150° C. to 350° C. a mixture of indene, potassium acrylate, and a catalytic amount of potassium hydroxide.

8. The process for producing an alkanoic acid substituted in the 3-position with a 1,2,3,10b-tetrahydrofluoranthenyl radical which comprises heating at 150° C. to 350° C. a mixture of 1,2,3,10b-tetrahydrofluoranthene, an alkali metal acrylate of the formula $CH_2=CRCO_2M$ wherein R is selected from the group consisting of hydrogen, alkyl of from 1 to 6 carbons and phenyl, and M is an alkali metal and a catalytic amount of an alkali metal hydroxide.

9. The process for producing 10b-(2-carboxyethyl)-1,2,3,10b-tetrahydrofluoranthene which comprises heating at 150° C. to 350° C. a mixture of 1,2,3,10b-tetrahydrofluoranthene, potassium acrylate, and potassium hydroxide.

References Cited by the Examiner

Bergmann et al., "Organic Reactions," vol. X, Wiley, New York, 1959, pp. 415, 457.

References Cited by the Applicant

Brunson, in JACS, 64, 2457–61 (October 1942).

LORRAINE A. WEINBERGER, *Primary Examiner.*

LEON ZITVER, *Examiner.*

R. E. MASSA, THOMAS L. GALLOWAY,
*Assistant Examiners.*

UNITED STATES PATENT OFFICE
CERTIFICATE OF CORRECTION

Patent No. 3,274,240　　　　　　　　　　　September 20, 1966

Henry E. Fritz

It is hereby certified that error appears in the above numbered patent requiring correction and that the said Letters Patent should read as corrected below.

Column 5, line 1, strike out "bis(1-carboxyethyl)indene, 1,1,3-tris(2-carboxyethyl)in-"; column 6, line 18, for "3-carboxypropyl)1-1" read -- 3-carboxypropyl)-1- --; line 75, after "1,3,-" insert -- bis(1-carboxyethyl)indene,1,1,3-tris(2-carboxyethyl)in- --.

Signed and sealed this 1st day of August 1967.

(SEAL)
Attest:

Edward M. Fletcher, Jr.
Attesting Officer

EDWARD J. BRENNER
Commissioner of Patents